(12) United States Patent
Olsen et al.

(10) Patent No.: US 7,793,894 B1
(45) Date of Patent: Sep. 14, 2010

(54) RETAINING SYSTEM

(75) Inventors: Robert F. Olsen, Monroe, MI (US);
James A. Papke, Temperance, MI (US)

(73) Assignee: Toledo Molding & Die, Inc., Toledo, OH (US)

( * ) Notice: Subject to any disclaimer, the term of this patent is extended or adjusted under 35 U.S.C. 154(b) by 1379 days.

(21) Appl. No.: 11/243,547

(22) Filed: Oct. 5, 2005

(51) Int. Cl.
*B62D 25/24* (2006.01)
(52) U.S. Cl. .................... 248/74.2; 180/69.2; 248/309.1
(58) Field of Classification Search ............ 248/311.2, 248/309.1, 229.16, 231.81, 231.85, 74.2; 220/735
See application file for complete search history.

(56) References Cited

U.S. PATENT DOCUMENTS

| | | | | |
|---|---|---|---|---|
| 3,861,015 A | * | 1/1975 | Hooven | 29/755 |
| 3,874,501 A | * | 4/1975 | Cronheim | 206/425 |
| 4,811,440 A | * | 3/1989 | Scott | 7/100 |
| 5,820,082 A | * | 10/1998 | Wright | 248/65 |
| 5,845,965 A | * | 12/1998 | Heath et al. | 297/188.19 |
| 6,494,594 B1 | * | 12/2002 | Schroetter | 362/249.01 |
| 6,615,604 B2 | * | 9/2003 | Neufang | 62/298 |
| 7,461,491 B1 | * | 12/2008 | Sorkin | 52/685 |
| 2005/0245126 A1 | * | 11/2005 | Colja et al. | 439/535 |

* cited by examiner

*Primary Examiner*—J. Allen Shriver, II
*Assistant Examiner*—Steven M Marsh
(74) *Attorney, Agent, or Firm*—MacMillan, Sobanski & Todd, LLC

(57) ABSTRACT

A retaining system having a member, a first clip and a second clip. The first clip is integrally formed on the member. The first clip has two spaced first clip walls in which at least one of the walls includes a detent. The second clip is integrally formed on the member. The second clip has two spaced clip walls. Both of the second clip walls have a detent.

14 Claims, 5 Drawing Sheets

RETAINING SYSTEM

CROSS-REFERENCE TO RELATED APPLICATIONS

Not Applicable.

STATEMENT REGARDING FEDERALLY SPONSORED RESEARCH OR DEVELOPMENT

Not Applicable.

TECHNICAL FIELD

The present invention relates generally to a retaining system. More specifically, the invention is directed to a retaining system having clips for securing an object.

BACKGROUND OF THE INVENTION

Prop rods for hoods have been secured in engine compartments of automobiles by plastic or metal clips that are attached to components. One method of attachment is to drill a hole in the component and insert the clip. If the component is a fluid reservoir, this can result in fluid leakage from the component. Another method is to weld the clip to the component. This adds cost to the component and/or the vehicle in which it is used. The present invention provides a superior retaining system for securing objects such as prop rods.

BRIEF SUMMARY OF THE INVENTION

A retaining system having a member, a first clip and a second clip. The first clip is integrally formed on the member. The first clip has two spaced first clip walls in which at least one of the walls has a detent.

The second clip is integrally formed on the member. The second clip has two spaced clip walls. Both of the second clip walls have a detent.

DETAILED DESCRIPTION OF THE INVENTION

Figure 1:
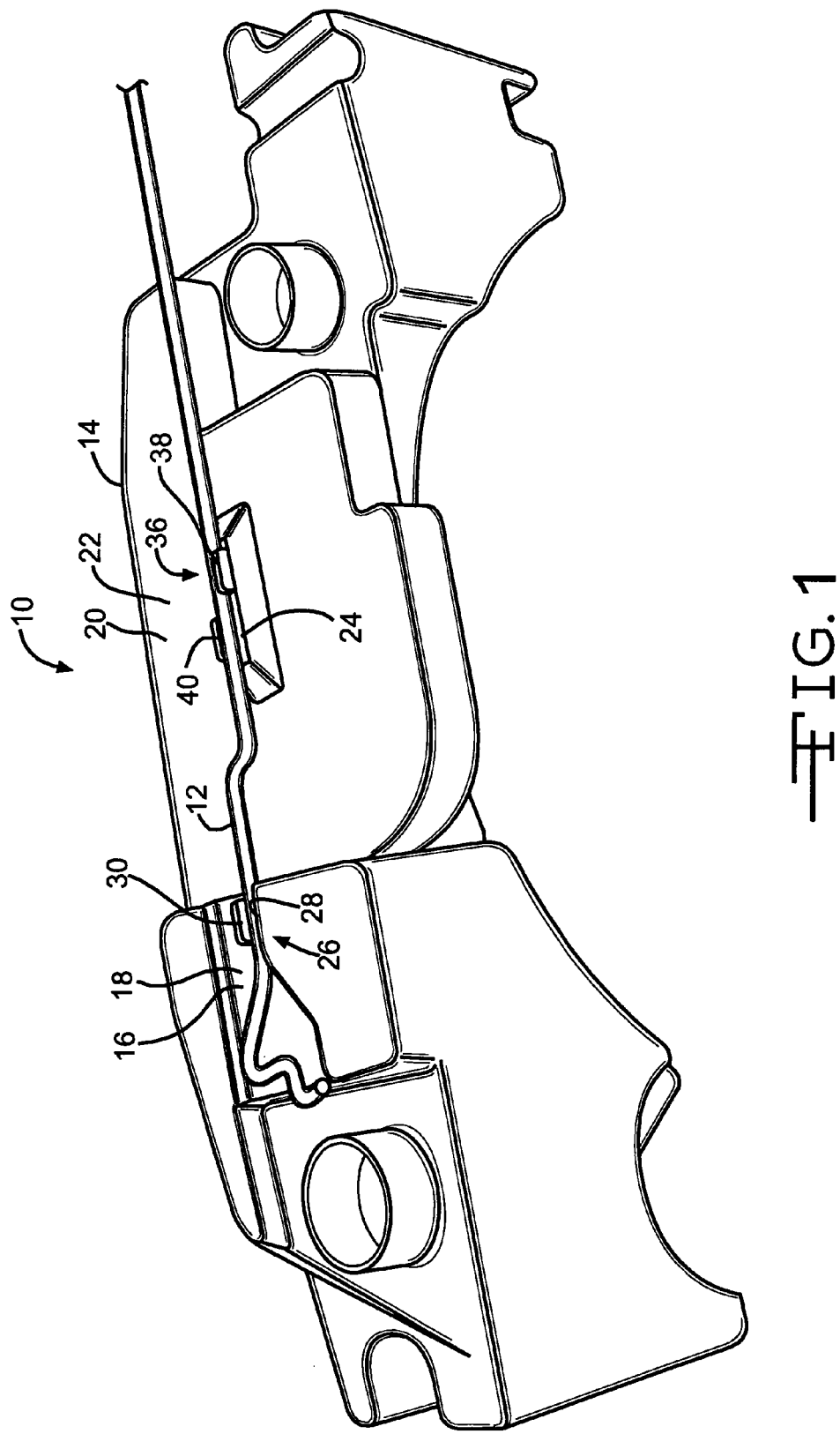
FIG. 1 is a perspective view of an embodiment of the retaining system of the present invention shown with a prop rod.
Figure 2:
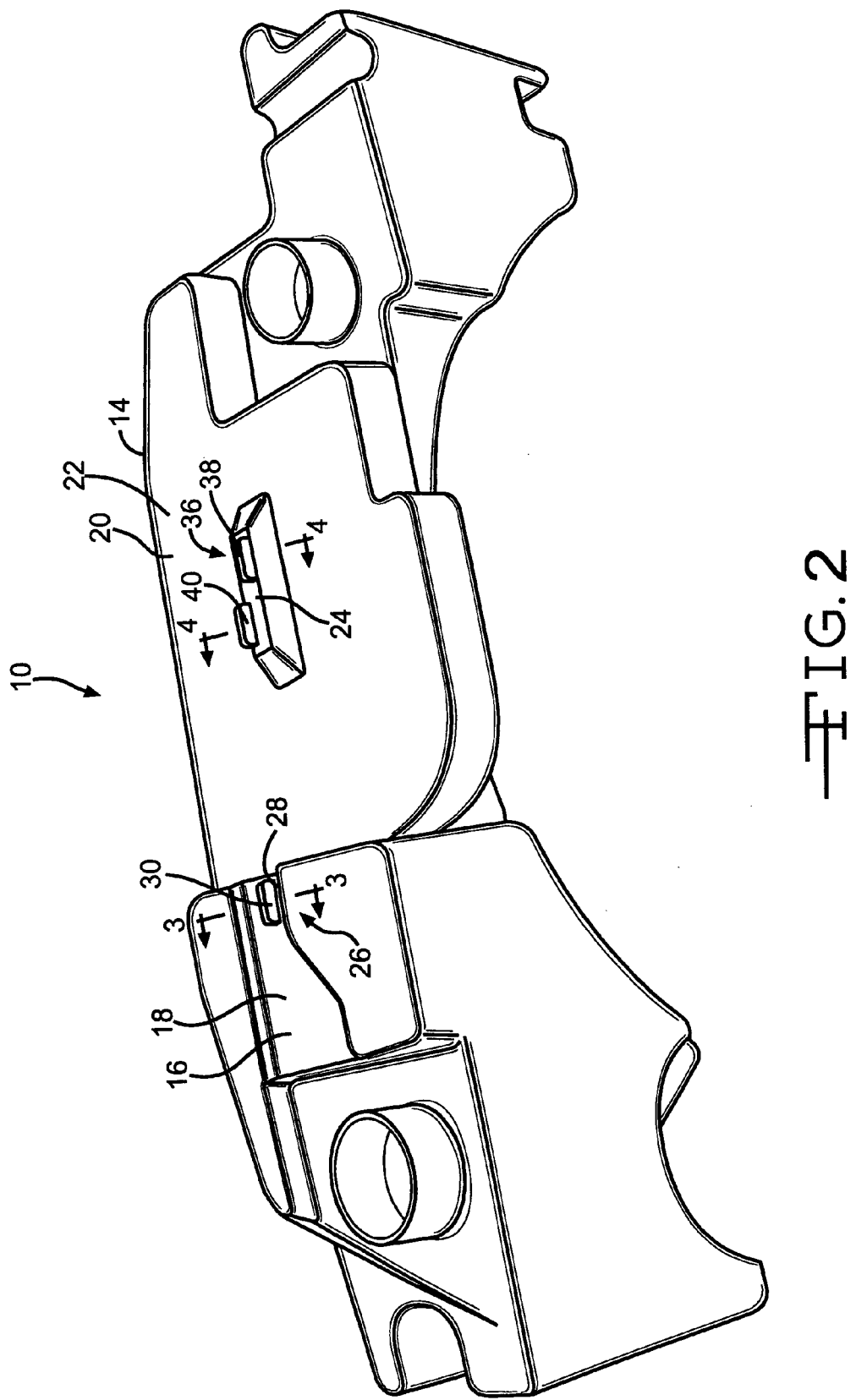
FIG. 2 is a perspective view similar to FIG. 1 in which the present invention is shown without the prop rod.

Referring to FIGS. 1 and 2, the retaining system 10 of the present invention secures, for example, an automotive hood prop rod 12 as shown. The system 10 has a member 14 such as an automotive fluid container component. The member 14 has a first surface 16 extending along a first plane 18 and a second surface 20 extending along a second plane 22. The first plane 18 is different than the second plane 22. For example, the first plane 18 is higher than the second plane 22 as shown. A raised platform 24 is positioned on the second surface 20.

Figure 3:
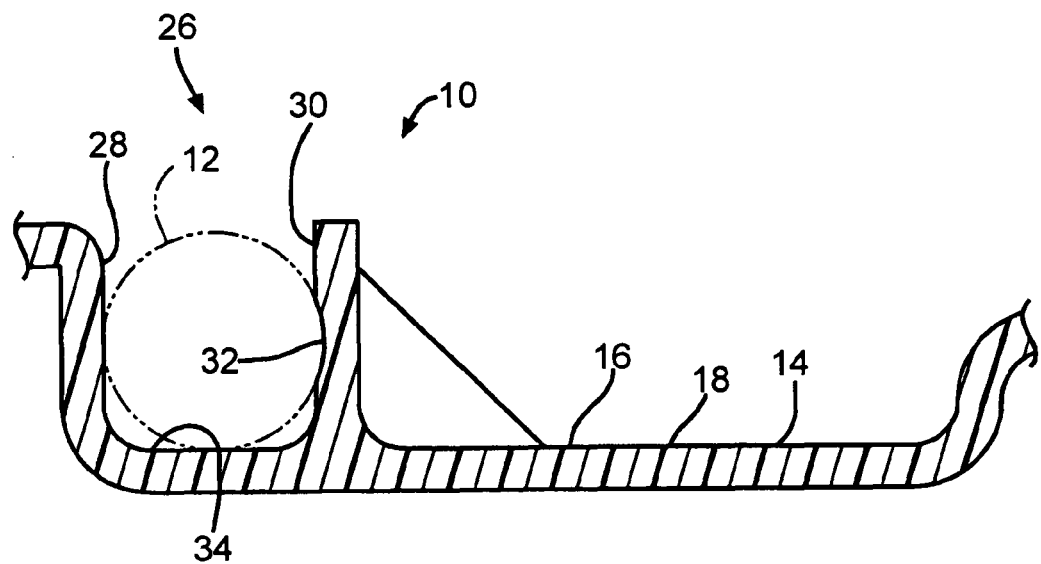
FIG. 3 is a cross-sectional view taken along line 3-3 of FIG. 2.

Referring to FIGS. 2 and 3, a first clip 26 is positioned on the first surface 16. The first clip 26 has two spaced first clip walls 28 and 30 that are directly opposite one another. As shown in FIG. 3, the wall 30 includes a detent 32. It should be understood that either of the first clip walls 28 or 30 can include the detent 32. Further, both of the first clip walls 28 and 30 can include detents. The first clip walls 28 and 30 extend upwardly from a first clip bottom wall 34. The first clip walls 28 and 30, the detent 32 and the first clip bottom wall 34 are sized and adapted to engage the prop rod 12 as shown in FIG. 3.

Figure 4:
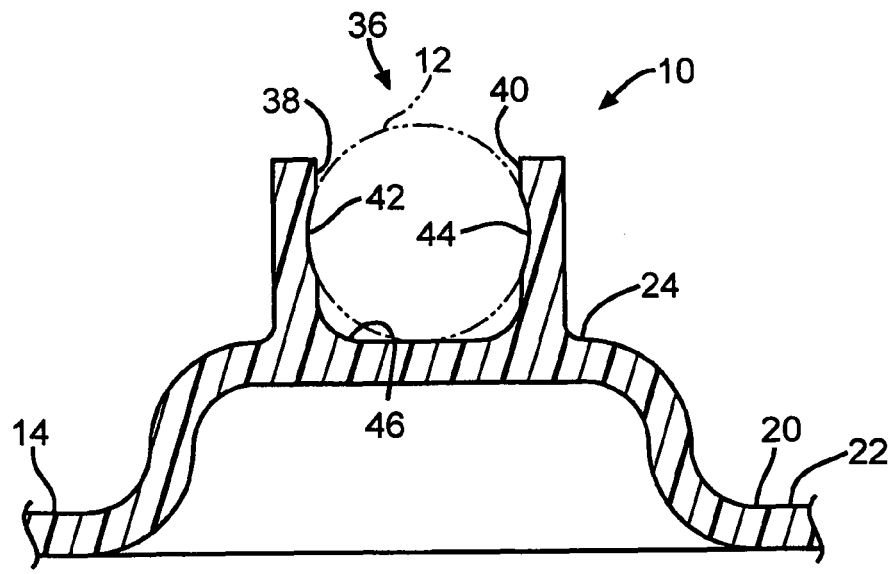
FIG. 4 is a cross-sectional view taken along line 4-4 of FIG. 2.

Referring to FIGS. 2 and 4, a second clip 36 is positioned on the raised platform 24. The second clip 36 has two spaced second clip walls 38 and 40 that are opposed in a staggered arrangement as shown in FIG. 2. As shown in FIG. 4, the wall 38 includes a detent 42 and the wall 40 includes a detent 44. The second clip walls 38 and 40 extend upwardly from a second clip bottom wall 46. The second clip walls 38 and 40, the detents 42 and 44 and the second clip bottom wall 46 are sized and adapted to engage the prop rod 12 as shown in FIG. 4.

Referring to FIGS. 1-4, the first clip 26 and the second clip 36 are integrally formed on the member 14 by, for example, an injection molding process. The member 14, the first clip 26 and second clip 36 are constructed of plastic. Examples of such plastic are polypropylene, nylon, polyethylene and acrylonitrile-butadiene-styrene. The integral formation of the first and second clips 26 and 36 on the member 14 prevents leakage around the clips, reduces costs associated with welding clips to a component and allows for the positioning of clips on the member as opposed to other structures.

Figure 5:
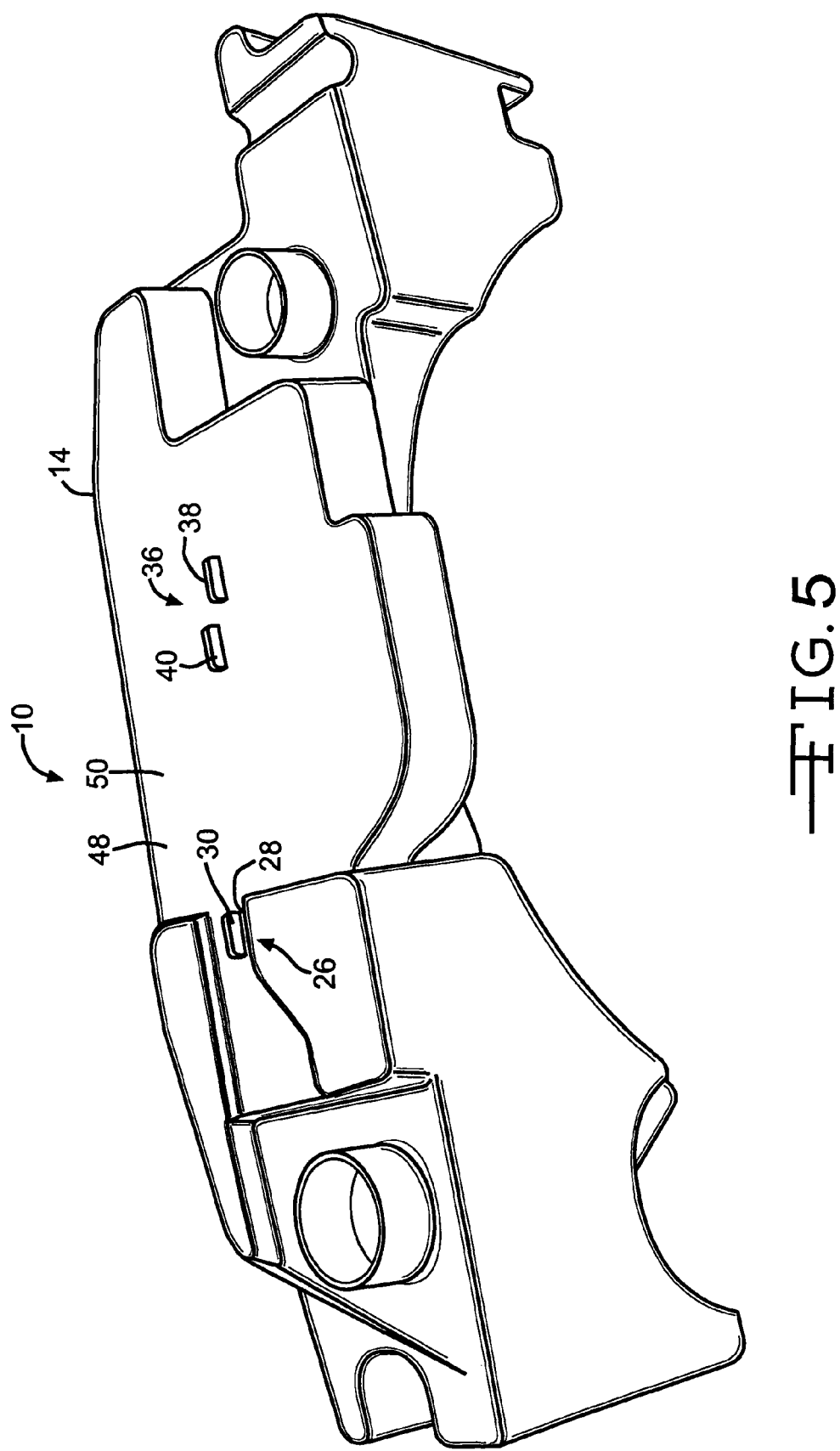
FIG. 5 is a perspective view of an alternative embodiment of the retaining system of the present invention.

An alternative embodiment of the present invention is shown in FIG. 5. In this embodiment, the member 14 has a surface 48 on a single plane 50. The first clip 26 and the second clip 36 are positioned on the surface 48. The second clip walls 38 and 40 are arranged in the opposed staggered arrangement as described above.

Figure 6:
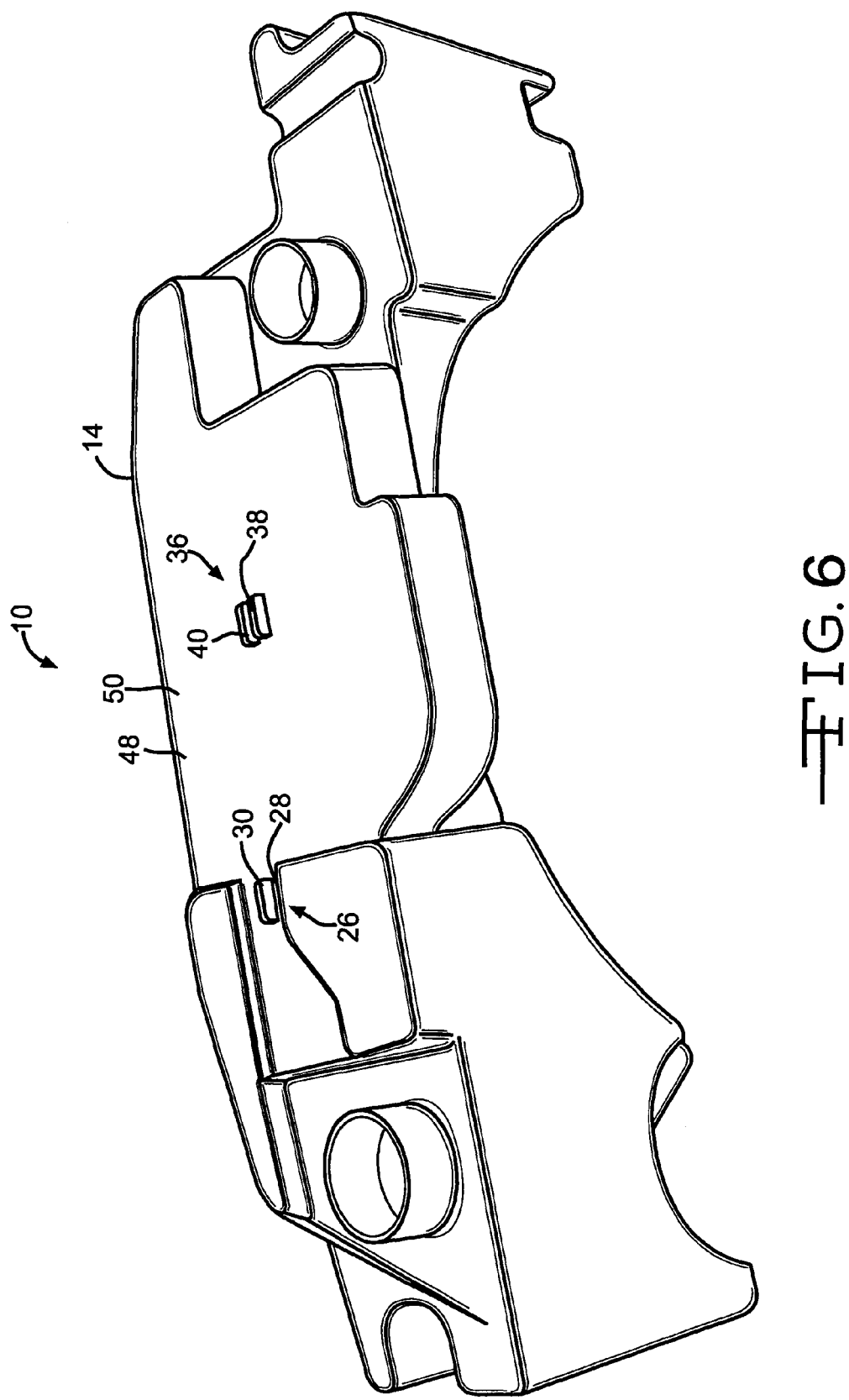
FIG. 6 is a perspective view of an alternative embodiment of the retaining system of the present invention.

Another alternative embodiment is shown in FIG. 6. In this embodiment, the second clip walls 38 and 40 are positioned directly opposite one another on the surface 48.

While the invention as been described with reference to particular embodiments, it should be understood that various changes may be made and equivalents may be substituted for elements thereof without departing from the essential scope of the invention. In addition, many modifications may be made to adapt a particular situation or material to the teachings of the invention without departing from the essential scope thereof. Therefore, it is intended that the invention not be limited to the particular embodiments, but that the invention shall include all embodiments falling within the scope of the claims.

The invention claimed is:

1. A retaining system comprising:
   an automotive fluid container member;
   a first clip integrally molded on said member, said first clip having two spaced first clip walls, at least one of said first clip walls having a detent;
   a second clip integrally molded on said member, said second clip having two spaced second clip walls, both of said second clip walls having a detent; and
   an automotive hood prop rod for retention by the first and second clips.

2. The retaining system of claim 1, wherein said member is plastic.

3. The retaining system of claim 2, wherein said first clip is plastic.

4. The retaining system of claim 2, wherein said second clip is plastic.

5. The retaining system of claim 1, wherein said member, first clip and second clip are formed of plastic.

6. The retaining system of claim 5, wherein said plastic is selected from the group consisting of polypropylene, nylon, polyethylene and acrylonitrile-butadiene-styrene.

7. The retaining system of claim 1, wherein said first clip walls are directly opposite one another.

8. The retaining system of claim 1, wherein said second clip walls are staggered.

9. The retaining system of claim 1, wherein said second clip walls are directly opposite one another.

10. The retaining system of claim 1, wherein said first clip walls are directly opposite one another and said second clip walls are staggered.

11. The retaining system of claim 1, wherein said first clip walls are directly opposite one another and said second clip walls are directly opposite one another.

12. The retaining system of claim 1, wherein said member has a first surface extending along a first plane and a second surface extending along a second plane, said first plane being different than said second plane, said first clip being on said first surface and said second clip being on said second surface.

13. The retaining system of claim 1, wherein said member has a surface, said first and second clips being on said surface.

14. The retaining system of claim 1, wherein said member has a platform, said second clip being on said platform.

* * * * *